US010207758B2

(12) United States Patent
Steinhauser et al.

(10) Patent No.: US 10,207,758 B2
(45) Date of Patent: Feb. 19, 2019

(54) KICKSTAND ASSEMBLY AND A BICYCLE THAT UTILIZES THE KICKSTAND ASSEMBLY

(71) Applicant: GM GLOBAL TECHNOLOGY OPERATIONS LLC, Detroit, MI (US)

(72) Inventors: Miranda P. Steinhauser, Royal Oak, MI (US); Wade W. Bryant, Grosse Pointe Farms, MI (US); Jess R. Bailie, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 15/631,526

(22) Filed: Jun. 23, 2017

(65) Prior Publication Data

US 2018/0370586 A1 Dec. 27, 2018

(51) Int. Cl.
*B62H 1/06* (2006.01)
*B62H 1/00* (2006.01)

(52) U.S. Cl.
CPC .............. *B62H 1/06* (2013.01); *B62H 1/00* (2013.01)

(58) Field of Classification Search
CPC .................................................. B62H 1/06
See application file for complete search history.

(56) References Cited

U.S. PATENT DOCUMENTS

| | | | | |
|---|---|---|---|---|
| 602,141 A * | 4/1898 | Plaisted | ................... | B62H 1/06 280/300 |
| 641,913 A * | 1/1900 | Wise | ........................ | B62H 1/06 280/300 |
| 651,649 A * | 6/1900 | Brown | ..................... | B62H 1/06 248/169 |
| 683,463 A * | 10/1901 | Helmer | ..................... | B62H 1/06 280/300 |
| 7,059,622 B2 * | 6/2006 | Chuang | .................... | B62H 1/06 280/293 |
| 9,457,864 B2 | 10/2016 | Bailie et al. | | |

OTHER PUBLICATIONS

Snapshots from a video of a foldable bicycle with a retractable kickstand from the internet page: https://www.youtube.com/watch?v=okcuwy_MmUU; published on Feb. 28, 2013 by Michael and Sean from Section Zero; accessed on May 30, 2017; 43 pages.

Photo of a pedal and a kickstand from the internet page: https://gzmyu4ma9b-flywheel.netdna-ssl.com/wp-content/uploads/2014/04/Bikerumor-Taipei-Show-Random-parts-weird-oddities-46.jpg; accessed on May 30, 2017; 1 page.

* cited by examiner

*Primary Examiner* — Kevin Hurley
(74) *Attorney, Agent, or Firm* — Quinn IP Law

(57) ABSTRACT

A kickstand assembly includes a post and a seat. A bicycle includes a frame and the kickstand assembly coupled to the frame. The post is disposed along a longitudinal axis and includes a first distal end and a second distal end. The seat is disposed at the first distal end of the post. The seat is movable between a use position and a non-use position. The kickstand assembly includes a kickstand disposed at the second distal end of the post, and extends outwardly away from the post transverse to the longitudinal axis. The kickstand is movable between a use position and a non-use position. The seat and the kickstand are fixed relative to each other at the respective first and second distal ends of the post such that movement of the seat to the non-use position directly causes movement of the kickstand to the use position.

19 Claims, 3 Drawing Sheets

KICKSTAND ASSEMBLY AND A BICYCLE THAT UTILIZES THE KICKSTAND ASSEMBLY

INTRODUCTION

Bicycles may include a frame and wheels supported by the frame. Generally, a front fork supports a front wheel of the bicycle and a rear hub supports a rear wheel of the bicycle. To maintain an upright position of the bicycle when the bicycle is not in use, a kickstand may be utilized. Traditionally, the kickstand is movably attached to the frame. In other configurations, the kickstand is movable attached to the rear hub.

SUMMARY

The present disclosure provides a kickstand assembly including a post and a seat. The post is disposed along a longitudinal axis and includes a first distal end and a second distal end that opposes the first distal end relative to the longitudinal axis. The seat is disposed at the first distal end of the post. The seat is movable between a use position and a non-use position. The kickstand assembly further includes a kickstand disposed at the second distal end of the post, and extends outwardly away from the post transverse to the longitudinal axis. The kickstand is movable between a use position and a non-use position. The seat and the kickstand are fixed relative to each other at the respective first and second distal ends of the post such that movement of the seat to the non-use position directly causes movement of the kickstand to the use position.

The present disclosure also provides a bicycle including a frame and a kickstand assembly coupled to the frame. The assembly includes a post coupled to the frame, and the post is disposed along a longitudinal axis. The post includes a first distal end and a second distal end that opposes the first distal end relative to the longitudinal axis. The post is movable axially along the longitudinal axis relative to the frame and rotatable around the longitudinal axis relative to the frame. The assembly further includes a seat disposed at the first distal end of the post. The seat is movable between a use position and a non-use position. The assembly also includes a kickstand disposed at the second distal end of the post, and extends outwardly away from the post transverse to the longitudinal axis. The kickstand is movable between a use position and a non-use position. The seat and the kickstand are fixed relative to each other at the respective first and second distal ends of the post such that movement of the seat to the non-use position directly causes movement of the kickstand to the use position.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
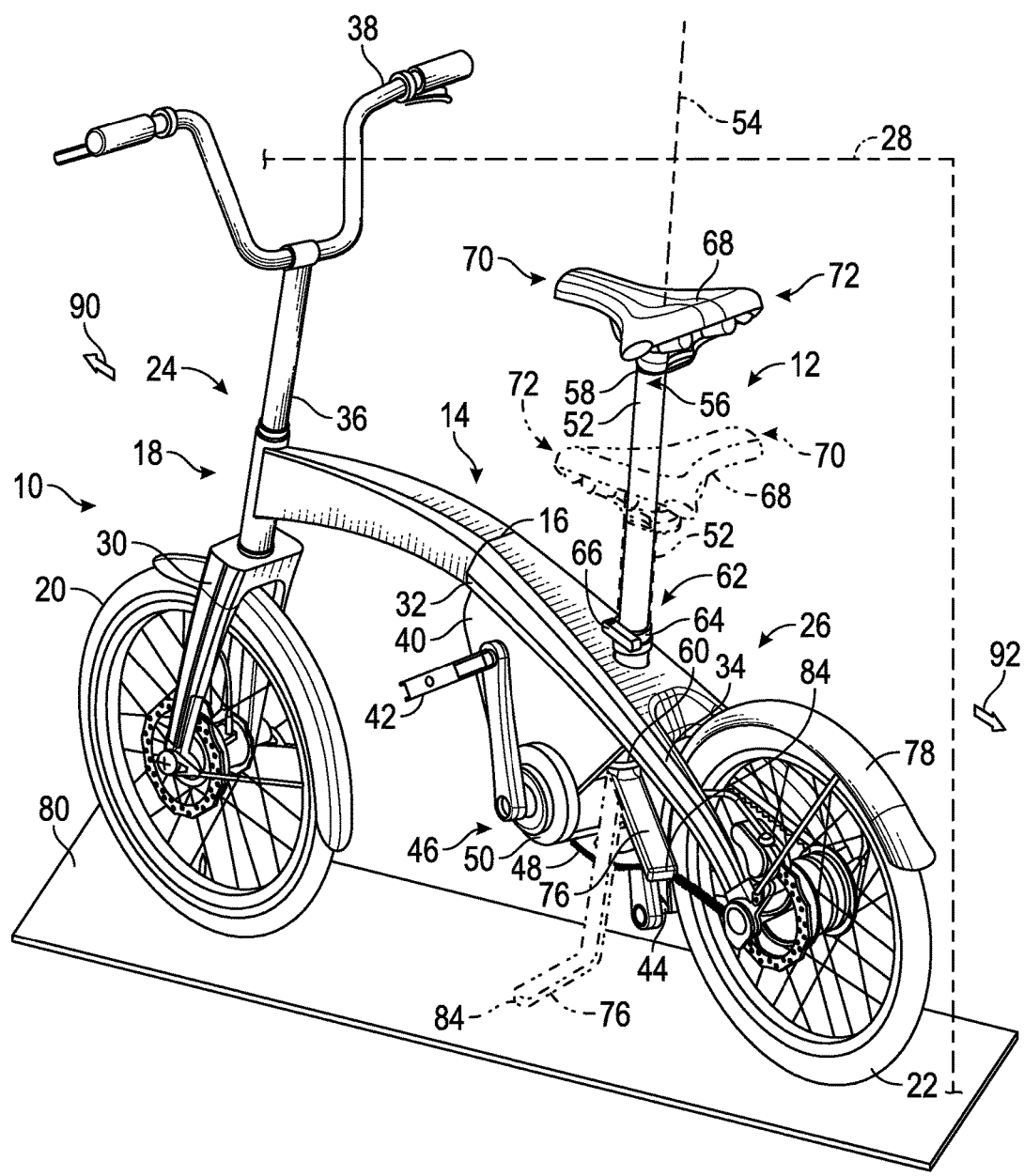
FIG. 1 is a schematic perspective view of a bicycle in an upright position, and a kickstand assembly.

Referring to the FIGS., wherein like numerals indicate like or corresponding parts throughout the several views, a bicycle 10 and a kickstand assembly 12 are generally shown in FIG. 1. The bicycle 10 may utilize the kickstand assembly 12, and the kickstand assembly 12 may maintain the bicycle 10 in an upright position (the upright position is shown in FIG. 1) when the bicycle 10 is not being ridden.

Figure 2:
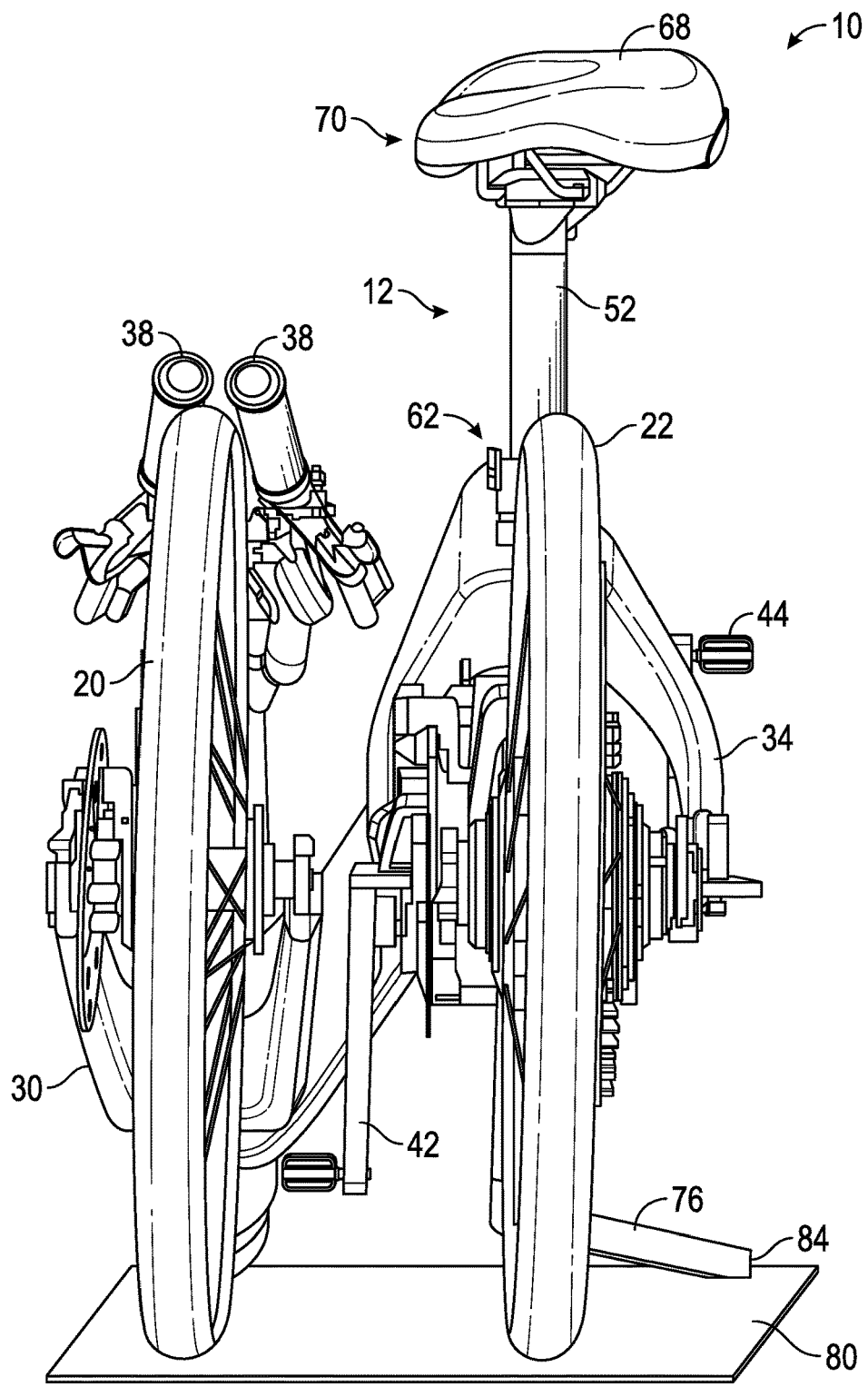
FIG. 2 is a schematic perspective view of the bicycle in a folded position, with a kickstand maintaining the bicycle in the upright position.

The bicycle 10 may be any suitable configuration, and the FIGS. are non-limiting examples. For example, the bicycle 10 may optionally include an integrated folding system 14 which allows an operator to fold the bicycle 10. FIG. 2 illustrates the bicycle 10 folded by utilizing the integrated folding system 14. Generally, by being able to fold the bicycle 10, the bicycle 10 may be easier to transport and/or store. Furthermore, the integrated folding system 14 may allow the operator to fold the bicycle 10 quickly and easily. FIG. 1 illustrates one example of a suitable location 16 that the bicycle 10 may be folded about. As another example, the bicycle 10 may not include the integrated folding system 14, and as such, in certain embodiments, the bicycle 10 is not foldable.

Continuing with FIG. 1, the bicycle 10 includes a frame 18, and the kickstand assembly 12 is coupled to the frame 18. The bicycle 10 may include a front wheel 20 and a rear wheel 22 spaced from each other, and the frame 18 may support the front and rear wheels 20, 22.

Furthermore, the frame 18 may include a forward portion 24 and a rearward portion 26 spaced from each other. The front wheel 20 may be disposed along the forward portion 24 and the rear wheel 22 may be disposed along the rearward portion 26. The frame 18 may define a plane 28 intersecting the forward and rearward portions 24, 26.

The frame 18 may include a front fork 30 which may be coupled to the front wheel 20 to support the front wheel 20 and a rear extension 32 which may be coupled to the rear wheel 22. The rear extension 32 may split into a fork 34 that supports the rear wheel 22. Generally, the plane 28 may intersect the front fork 30 and the rear extension 32. In certain embodiments, the plane 28 may split the front fork 30 and the fork 34 of the rear extension 32 in half.

When utilizing the integrated folding system 14, one suitable location 16 where the bicycle 10 may be folded is along the rear extension 32. Therefore, in certain embodiments, the rear extension 32 may be split into a plurality of pieces to accommodate part of the integrated folding system 14.

Continuing with FIG. 1, the bicycle 10 may also include a stem 36 coupled to the front fork 30 and a plurality of handle bars 38 coupled to the stem 36. Generally, the handle bars 38 may be used to control the direction of the front wheel 20.

As best shown in FIG. 1, the bicycle 10 may also include a bracket 40 that extends from the rear extension 32. Furthermore, the bicycle 10 may include a first pedal assembly 42 and a second pedal assembly 44 which may be located between the front and rear wheels 20, 22. The first and second pedal assemblies 42, 44 may be supported by the rear extension 32, and in certain embodiments, supported by the bracket 40. The pedal assemblies 42, 44 may be moveably coupled to the front and/or rear wheels 20, 22 through a drive apparatus 46. Therefore, generally, movement of the pedal assemblies 42, 44 causes movement of the wheels 20, 22 to propel the bicycle 10 in a particular direction. As shown in FIG. 1, the pedal assemblies 42, 44 are moveably coupled to the rear wheel 22 through the drive apparatus 46.

The drive apparatus 46 may include a belt 48 or a chain, one or more gears and/or sprockets, etc. The bicycle 10 may be manually driven by the operator moving the pedal assemblies 42, 44 or the bicycle 10 may be automatically driven via a motor 50. Therefore, optionally, the drive apparatus 46 may include the motor 50, and in certain embodiments, the motor 50 may be an electric motor or any other suitable apparatus to automatically drive the bicycle 10.

The motor 50 may be supported by the rear extension 32, and in certain embodiments, supported by the bracket 40. The motor 50 automatically drives the belt 48 or chain to rotate the wheels 20, 22 (without the pedal assemblies 42, 44 being manually operated by the operator). The bicycle 10 may be designed having the first and second pedal assemblies 42, 44, as well as the motor 50, or alternatively, the bicycle 10 may be designed having the first and second pedal assemblies 42, 44 but without the motor 50. Therefore, the bicycle 10 discussed herein may be a manually-operated bicycle or a self-propelled bicycle, e.g., an electric bicycle. It is to be appreciated that the manually-operated bicycle and/or the self-propelled bicycle may optionally include the integrated folding system 14.

Figure 3:
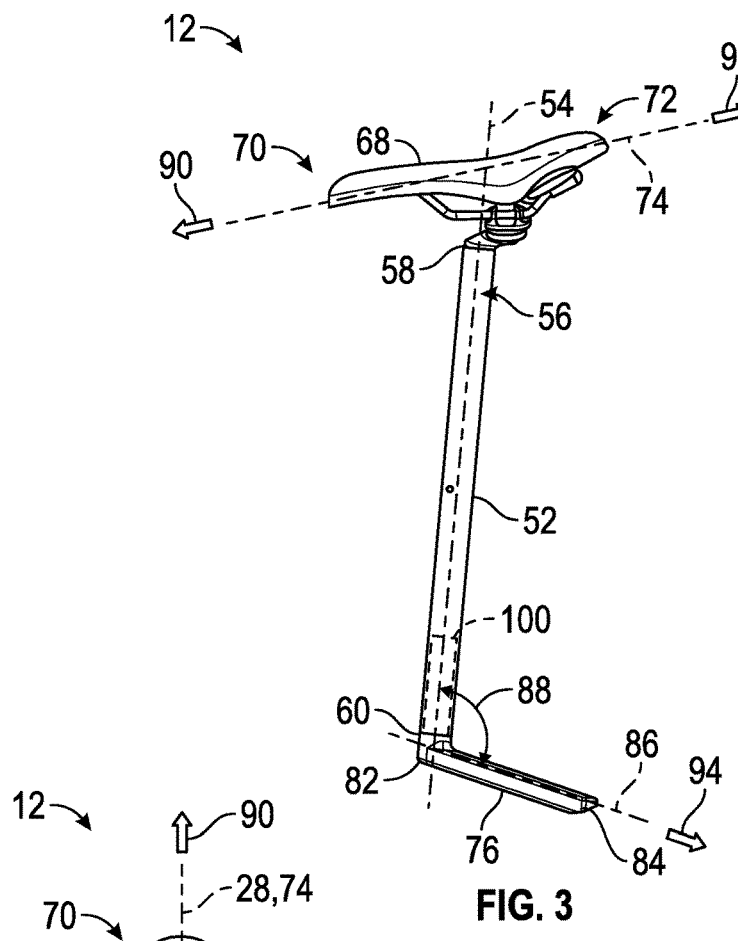
FIG. 3 is a schematic perspective view of the kickstand assembly.

Referring to FIGS. 1 and 3, the kickstand assembly 12 includes a post 52 disposed along a longitudinal axis 54. The post 52 may be coupled to the frame 18, and in certain embodiments, is coupled to the rear extension 32. Therefore, generally, the post 52 is supported by the frame 18, and in certain embodiments, supported by the rear extension 32. Furthermore, the post 52 may be located between the first and second pedal assemblies 42, 44. It is to be appreciated that the post 52 may be in any suitable location.

As best shown in FIG. 1, the post 52 is movable axially along the longitudinal axis 54 relative to the frame 18 and rotatable around the longitudinal axis 54 relative to the frame 18. Simply stated, the post 52 may be movable up and down relative to the frame 18 and may be rotatable clockwise and counterclockwise relative to the longitudinal axis 54. Furthermore, the post 52 may include an outer surface 56 facing outwardly away from the longitudinal axis 54.

As best shown in FIG. 3, the post 52 includes a first distal end 58 and a second distal end 60 that opposes the first distal end 58 relative to the longitudinal axis 54. Referring to FIG. 1, the plane 28 of the frame 18 may intersect the first and second distal ends 58, 60 of the post 52. Furthermore, the post 52 extends through the frame 18. In other words, the first and second distal ends 58, 60 of the post 52 are separated by the frame 18. As such, the first and second distal ends 58, 60 of the post 52 are exposed to assemble various components, discussed below, to the post 52.

Continuing with FIG. 1, the bicycle 10 may also include a locking apparatus 62 to secure the post 52 in a particular position relative to the longitudinal axis 54. The locking apparatus 62 may be supported by the frame 18 and/or the post 52. In certain embodiments, the locking apparatus 62 may include a clamp 64 having a finger 66 movable to selectively allow adjustment of the post 52. For example, the finger 66 may be moved in one direction to release the clamp 64 such that the post 52 is unclamped to allow the post 52 to be adjusted, and when the desired position of the post 52 is reached, the finger 66 may be moved in another direction to cause the clamp 64 to secure the post 52 in that particular position.

Referring to FIGS. 1 and 3, the kickstand assembly 12 also includes a seat 68 disposed at the first distal end 58 of the post 52. Generally, the seat 68 is supported by the post 52 and may be located between the first and second pedal assemblies 42, 44. It is to be appreciated that the seat 68 may be in any suitable location.

Continuing with FIGS. 1 and 3, the seat 68 may include a front portion 70 and a rear portion 72 spaced from each other along a seat axis 74. Generally, the first distal end 58 of the post 52 may be disposed between the front and rear portions 70, 72 of the seat 68. The seat axis 74 is disposed transverse to the longitudinal axis 54.

As best shown in FIG. 1, the seat 68 is adjustable. For example, the seat 68 is movable axially along the longitudinal axis 54 relative to the frame 18 and rotatable around the longitudinal axis 54 relative to the frame 18. The seat 68 is secured to the post 52, so movement of the post 52 axially and rotatably correspondingly moves the seat 68 axially and rotatably. As such, the seat 68 and the post 52 may be movable in unison or as a single unit axially along the longitudinal axis 54 and rotatably around the longitudinal axis 54.

The seat 68 may be movable up and down relative to the frame 18. For example, the height of the seat 68 relative to the pedal assemblies 42, 44 may be adjusted to different heights of the operator. The seat 68 may also be adjustable up and down relative to the frame 18 for other reasons, which are discussed further below. Therefore, movement of the post 52 axially along the longitudinal axis 54 correspondingly moves the seat 68 up or down relative to the frame 18.

Furthermore, the seat 68 is movable between a use position and a non-use position. Specifically, the seat 68 is rotatable relative to the longitudinal axis 54 between the use and non-use positions. As such, the seat 68 may be rotatable clockwise and counterclockwise relative to the longitudinal axis 54. Rotation of the post 52 around the longitudinal axis 54 correspondingly rotates the seat 68 around the longitudinal axis 54. When the seat 68 is in the use position, the operator may be riding the bicycle 10, and when the seat 68 is in the non-use position, the operator is not riding the bicycle 10. FIG. 1 illustrates the seat 68 in the use position in solid lines and the seat 68 in the non-use position in phantom lines.

Referring to FIGS. 1 and 3, the kickstand assembly 12 further includes a kickstand 76 disposed at the second distal end 60 of the post 52. Generally, the kickstand 76 is supported by the post 52. The kickstand 76 extends outwardly away from the post 52 transverse to the longitudinal axis 54. The kickstand 76 may be utilized to maintain the bicycle 10 in the upright position as shown in FIG. 1. Furthermore, if utilizing the integrated folding system 14, the kickstand 76 may be utilized to maintain the bicycle 10, in the folded position, in the upright position as shown in FIG. 2.

As best shown in FIG. 1, the kickstand 76 is adjustable. For example, the kickstand 76 is movable axially along the longitudinal axis 54 relative to the frame 18 and rotatable around the longitudinal axis 54 relative to the frame 18. The kickstand 76 is secured to the post 52, so movement of the post 52 axially and rotatably correspondingly moves the kickstand 76 axially and rotatably. As such, the seat 68, the kickstand 76 and the post 52 may be movable in unison or as a single unit axially along the longitudinal axis 54 and rotatably around the longitudinal axis 54.

The kickstand 76 is movable between a use position and a non-use position. Specifically, the kickstand 76 is rotatable relative to the longitudinal axis 54 between the use and non-use positions. As such, the kickstand 76 may be rotatable clockwise and counterclockwise relative to the longitudinal axis 54. Rotation of the post 52 around the longitudinal axis 54 correspondingly rotates the seat 68 and the kickstand 76 around the longitudinal axis 54. When the kickstand 76 is in the use position, the operator is not riding the bicycle 10, and when the seat 68 is in the non-use position, the operator may be riding the bicycle 10. FIG. 1 illustrates the kickstand 76 in the non-use position in solid lines and the kickstand 76 in the use position in phantom lines.

As best shown in FIG. 1, regardless of the kickstand 76 being in the use position or the non-use position, at least a portion of the kickstand 76 is constantly visible. For example, the kickstand 76 is visible when the kickstand 76 is in the non-use position, and the kickstand 76 is visible when the kickstand 76 is in the use position. Specifically, the kickstand 76 is visible from the outer surface 56 of the post 52 when the kickstand 76 is in the non-use position, and the kickstand 76 is visible from the outer surface 56 of the post 52 when the kickstand 76 is in the use position.

The kickstand 76 may be stowed out of the way of the other components of the bicycle 10 when the kickstand 76 is in the non-use position. Therefore, the kickstand 76 does not interfere with any of the other components of the bicycle 10 when the kickstand 76 is in the non-use position. For example, the kickstand 76 may be disposed proximal to a fender 78 (see FIG. 1) of the rear wheel 22 when the kickstand 76 is in the non-use position. As another example, the kickstand 76 may be disposed behind the motor 50 relative to the rearward portion 26 of the frame 18 when the kickstand 76 is in the non-use position. Simply stated, the kickstand 76 is angled backward out of the way of the operator when the kickstand 76 is in the non-use position.

As best shown in FIG. 1, the seat 68 and the kickstand 76 are fixed relative to each other at the respective first and second distal ends 58, 60 of the post 52 such that movement of the seat 68 to the non-use position directly causes movement of the kickstand 76 to the use position. Simply stated, when the seat 68 is in the use position, the kickstand 76 is not being utilized, and when the seat 68 is in the non-use position, the kickstand 76 is being utilized. As mentioned above, the seat 68, the kickstand 76 and the post 52 are rotatable around the longitudinal axis 54 as the single unit.

When utilizing the kickstand 76, the kickstand 76 may be adjusted to the terrain or ground surface 80 to maintain the bicycle 10 in the upright position. For example, the height of the kickstand 76 relative to the frame 18 may be adjusted (e.g., up and down adjustments relative to the longitudinal axis 54) and/or the angular position of the kickstand 76 relative to the frame 18 may be adjusted (e.g., rotational adjustments relative to the longitudinal axis 54) in light of the terrain/ground surface 80. For example, the terrain/ground surface 80 may be steep, flat, bumpy, etc.

To utilize the kickstand 76, the finger 66 of the locking apparatus 62 is moved to release the clamp 64 which allows movement of the post 52, the seat 68 may be grasped and moved axially along the longitudinal axis 54 and/or rotated around the longitudinal axis 54 to move the seat 68, the post 52 and the kickstand 76. When the desired position of the kickstand 76 is reached, i.e., the use position of the kickstand 76, the finger 66 of the locking apparatus 62 is moved back to secure the post 52 in that particular position, and thus, the kickstand 76 maintains the bicycle 10 in the upright position.

Figure 4:
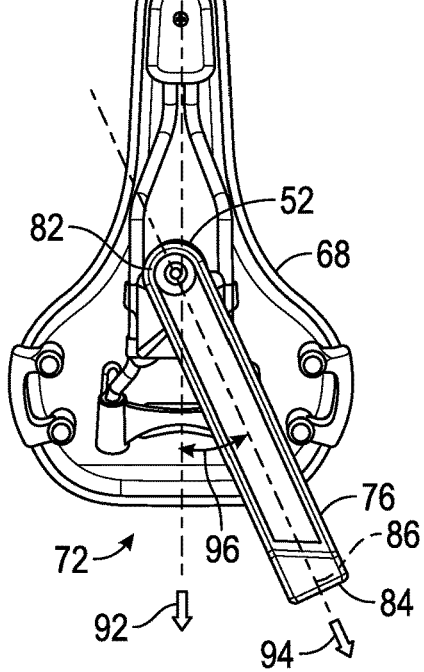
FIG. 4 is a schematic bottom view of the kickstand assembly.

Referring to FIGS. 3 and 4, the kickstand 76 may include a proximal end 82 and a distal end 84 spaced from each other along a kickstand axis 86. Generally, the proximal end 82 of the kickstand 76 may be disposed closer to the second distal end 60 of the post 52 than the distal end 84 of the kickstand 76. Generally, the kickstand axis 86 is disposed transverse to the longitudinal axis 54. Additionally, the kickstand axis 86 and the seat axis 74 do not intersect and are not parallel to each other. The kickstand 76 may be tilted or sloped relative to the longitudinal axis 54. As such, the kickstand axis 86 may be disposed at a first angle 88 relative to the longitudinal axis 54.

Furthermore, the kickstand axis 86 may be disposed in a different orientation from the seat axis 74 relative to the longitudinal axis 54. As such, the front portion 70 of the seat 68 may face outwardly in a first direction 90 (see FIGS. 1, 3 and 4) relative to the seat axis 74 when the seat 68 is in the use position. Additionally, the front portion 70 of the seat 68 and the forward portion 24 of the frame 18 may face in the first direction 90 when the seat 68 is in the use position, and the rear portion 72 of the seat 68 and the rearward portion 26 of the frame 18 may face in a second direction 92 (see FIGS. 1, 3 and 4) opposite the first direction 90 when the seat 68 is in the use position. In addition, the distal end 84 of the kickstand 76 may face outwardly in a direction 94, herein referred to as a third direction 94 (see FIGS. 3 and 4), relative to the kickstand axis 86 when the kickstand 76 is in the non-use position. As best shown in FIG. 4, the first direction 90 is different than the third direction 94.

Referring to FIGS. 1 and 4, the seat axis 74 is parallel to the plane 28 when the seat 68 is in the use position such that the plane 28 intersects the front and rear portions 70, 72 of the seat 68 when the seat 68 is in the use position. Furthermore, the seat axis 74 is transverse to the plane 28 when the seat 68 is in the non-use position such that the front and rear portions 70, 72 of the seat 68 are offset from the plane 28 when the seat 68 is in the non-use position.

In addition, the plane 28 may intersect a portion of the kickstand 76 when the kickstand 76 is in the use position, and the plane 28 may intersect another portion of the kickstand 76 when the kickstand 76 is in the non-use position. The kickstand axis 86 is disposed at an angle 96 (see FIG. 4) relative to the plane 28 when the kickstand 76 is in the non-use position. In certain embodiments, the angle 96 of the kickstand 76 may not be equal to zero degrees and may not be equal to one hundred eighty degrees relative to the plane 28 when the kickstand 76 is in the non-use position and the seat 68 is in the use position. Furthermore, in certain embodiments, the kickstand axis 86 is disposed at a second angle relative to the plane 28 when the kickstand 76 is in the use position, with the second angle being different from the angle 96 when the kickstand 76 is in the non-use position. In certain embodiments, the second angle may not be equal to zero degrees and may not be equal to one hundred eighty degrees relative to the plane 28 when the kickstand 76 is in the use position and the seat 68 is in the non-use position. Generally, the angle 96 and the second angle of the kickstand 76 relative to the plane 28 are at a different orientation than the first angle 88 of the kickstand 76 relative to the longitudinal axis 54.

Figure 5:
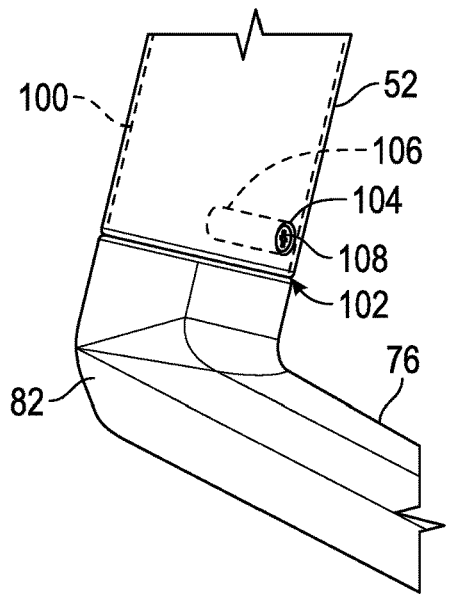
FIG. 5 is a schematic fragmentary perspective view of a post and the kickstand.

Referring to FIGS. 3 and 5, the kickstand 76 may also include a coupler 100 extending from the proximal end 82 of the kickstand 76. The coupler 100 is secured to the second distal end 60 of the post 52 to fix a position of the kickstand 76 relative to a position of the seat 68. The second distal end 60 of the post 52 may define an opening 102, and at least a portion of the coupler 100 is disposed inside the opening 102 to secure the kickstand 76 to the post 52. At least a portion of the coupler 100 may be hidden inside the post 52. In other words, at least a portion of the coupler 100 is not visible from the outer surface 56 of the post 52.

Referring to FIG. 5, the post 52 may include a first alignment feature 104 and the kickstand 76 may include a second alignment feature 106. The first and second alignment features 104, 106 cooperate to fix the position of the kickstand 76 relative to the position of the seat 68. For example, the first and second alignment features 104, 106 may be defined as a respective hole that aligns with each other. A member 108 may be disposed in the holes to fix the position of the kickstand 76 relative to the position of the seat 68. The member 108 may be any suitable configuration, and non-limiting examples may include a plug, a pin, a screw, a shaft, etc.

The kickstand assembly 12 discussed herein provides weight reductions, less independently moving parts, less parts as compared to a traditional bicycle. Furthermore, the kickstand 76 may be supplied with the purchase of the bicycle 10 or be an after-market item added to the bicycle 10.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A kickstand assembly comprising:
a post disposed along a longitudinal axis and including a first distal end and a second distal end that opposes the first distal end relative to the longitudinal axis;
a seat disposed at the first distal end of the post, with the seat movable between a use position and a non-use position;
a kickstand disposed at the second distal end of the post and extending outwardly away from the post transverse to the longitudinal axis;
wherein the kickstand is movable between a use position and a non-use position; and
wherein the seat and the kickstand are fixed relative to each other at the respective first and second distal ends of the post such that movement of the seat to the non-use position directly causes movement of the kickstand to the use position.

2. The assembly as set forth in claim 1 wherein the seat includes a front portion and a rear portion spaced from each other along a seat axis, with the first distal end of the post disposed between the front and rear portions of the seat, and wherein the seat axis is disposed transverse to the longitudinal axis.

3. The assembly as set forth in claim 2 wherein the kickstand includes a proximal end and a distal end spaced from each other along a kickstand axis, and wherein the kickstand axis is disposed transverse to the longitudinal axis.

4. The assembly as set forth in claim 3 wherein the kickstand includes a coupler extending from the proximal end of the kickstand, and the coupler is secured to the second distal end of the post to fix a position of the kickstand relative to a position of the seat.

5. The assembly as set forth in claim 4 wherein the second distal end of the post defines an opening, and wherein at least a portion of the coupler is disposed inside the opening to secure the kickstand to the post.

6. The assembly as set forth in claim 3 wherein the proximal end of the kickstand is disposed closer to the second distal end of the post than the distal end of the kickstand.

7. The assembly as set forth in claim 3 wherein the kickstand axis is disposed at a first angle relative to the longitudinal axis, and the kickstand axis is disposed in a different orientation from the seat axis relative to the longitudinal axis.

8. The assembly as set forth in claim 3 wherein the kickstand axis and the seat axis do not intersect and are not parallel to each other.

9. The assembly as set forth in claim 3 wherein the front portion of the seat faces outwardly in a first direction relative to the seat axis when the seat is in the use position, and the distal end of the kickstand faces outwardly in a direction relative to the kickstand axis when the kickstand is in the non-use position, with the first direction being different than the direction.

10. The assembly as set forth in claim 1 wherein the post includes a first alignment feature and the kickstand includes a second alignment feature, and wherein the first and second alignment features cooperate to fix a position of the kickstand relative to a position of the seat.

11. The assembly as set forth in claim 1 wherein the kickstand is visible when the kickstand is in the non-use position.

12. The assembly as set forth in claim 1 wherein the seat, the kickstand and the post are rotatable around the longitudinal axis as a single unit.

13. The assembly as set forth in claim 1 wherein:
the seat includes a front portion and a rear portion spaced from each other along a seat axis, with the first distal end of the post disposed between the front and rear portions of the seat;
the kickstand includes a proximal end and a distal end spaced from each other along a kickstand axis, with the proximal end of the kickstand disposed closer to the second distal end of the post than the distal end of the kickstand;
the seat axis and the kickstand axis are each disposed transverse to the longitudinal axis;
the kickstand axis and the seat axis do not intersect and are not parallel to each other;
the kickstand includes a coupler extending from the proximal end of the kickstand, and the coupler is secured to the second distal end of the post to fix a position of the kickstand relative to a position of the seat;

the second distal end of the post defines an opening, with at least a portion of the coupler disposed inside the opening to secure the kickstand to the post;

the post includes a first alignment feature and the kickstand includes a second alignment feature, with the first and second alignment features cooperating to fix the position of the kickstand relative to the position of the seat; and the post includes an outer surface facing outwardly away from the longitudinal axis, and the kickstand is visible from the outer surface of the post when the kickstand is in the non-use position.

14. A bicycle comprising:

a frame;

a kickstand assembly coupled to the frame, with the assembly including:
- a post coupled to the frame and disposed along a longitudinal axis,
- wherein the post includes a first distal end and a second distal end that opposes the first distal end relative to the longitudinal axis;
- wherein the post is movable axially along the longitudinal axis relative to the frame and rotatable around the longitudinal axis relative to the frame;
- a seat disposed at the first distal end of the post, with the seat movable between a use position and a non-use position;
- a kickstand disposed at the second distal end of the post and extending outwardly away from the post transverse to the longitudinal axis;
- wherein the kickstand is movable between a use position and a non-use position; and
- wherein the seat and the kickstand are fixed relative to each other at the respective first and second distal ends of the post such that movement of the seat to the non-use position directly causes movement of the kickstand to the use position.

15. The bicycle as set forth in claim 14 wherein:

the frame defines a plane intersecting the first and second distal ends of the post;

the seat includes a front portion and a rear portion spaced from each other along a seat axis; and the seat axis is parallel to the plane when the seat is in the use position such that the plane intersects the front and rear portions of the seat when the seat is in the use position, and the seat axis is transverse to the plane when the seat is in the non-use position such that the front and rear portions of the seat are offset from the plane when the seat is in the non-use position.

16. The bicycle as set forth in claim 15 wherein:

the frame includes a forward portion and a rearward portion spaced from each other, with the plane intersecting the forward and rearward portions; and the front portion of the seat and the forward portion of the frame face in a first direction when the seat is in the use position, and the rear portion of the seat and the rearward portion of the frame face in a second direction opposite the first direction when the seat is in the use position.

17. The bicycle as set forth in claim 15 wherein:

the plane intersects a portion of the kickstand when the kickstand is in the use position and another portion of the kickstand when the kickstand is in the non-use position; and the kickstand axis is disposed at an angle not equal to zero degrees and not equal to one hundred eighty degrees relative to the plane when the kickstand is in the non-use position and the seat is in the use position.

18. The bicycle as set forth in claim 14 wherein:

the kickstand includes a coupler extending from a proximal end of the kickstand, and the coupler is secured to the second distal end of the post to fix a position of the kickstand relative to a position of the seat; and the post includes a first alignment feature and the kickstand includes a second alignment feature, with the first and second alignment features cooperating to fix the position of the kickstand relative to the position of the seat.

19. The bicycle as set forth in claim 14 wherein:

the seat includes a front portion and a rear portion spaced from each other along a seat axis, with the first distal end of the post disposed between the front and rear portions of the seat;

the kickstand includes a proximal end and a distal end spaced from each other along a kickstand axis, with the proximal end of the kickstand disposed closer to the second distal end of the post than the distal end of the kickstand;

the seat axis and the kickstand axis are each disposed transverse to the longitudinal axis;

the kickstand axis and the seat axis do not intersect and are not parallel to each other;

the kickstand includes a coupler extending from the proximal end of the kickstand, and the coupler is secured to the second distal end of the post to fix a position of the kickstand relative to a position of the seat;

the second distal end of the post defines an opening, with at least a portion of the coupler disposed inside the opening to secure the kickstand to the post;

the post includes a first alignment feature and the kickstand includes a second alignment feature, with the first and second alignment features cooperating to fix the position of the kickstand relative to the position of the seat; and the post includes an outer surface facing outwardly away from the longitudinal axis, and the kickstand is visible from the outer surface of the post when the kickstand is in the non-use position.

* * * * *